US005920056A

United States Patent [19]
Bonnet

[11] Patent Number: 5,920,056

[45] Date of Patent: Jul. 6, 1999

[54] OPTICALLY-GUIDED INDICIA READER SYSTEM FOR ASSISTING IN POSITIONING A PARCEL ON A CONVEYOR

[75] Inventor: Henri Bonnet, Atlanta, Ga.

[73] Assignee: United Parcel Service of America, Inc., Danbury, Conn.

[21] Appl. No.: 08/787,974

[22] Filed: Jan. 23, 1997

[51] Int. Cl.[6] .............................. G06K 15/00; G06K 7/10

[52] U.S. Cl. ........................ 235/383; 235/437; 235/462.2; 235/462.25; 250/223 R

[58] Field of Search .................................... 235/383, 437, 235/462.2, 472, 462.09, 462.25; 250/223 R, 234, 235, 236, 566, 567, 588

[56] References Cited

U.S. PATENT DOCUMENTS

| | | | |
|---|---|---|---|
| 3,515,254 | 6/1970 | Gary | 198/21 |
| 3,802,548 | 4/1974 | Wentz et al. | 198/40 |
| 4,516,265 | 5/1985 | Kizu et al. | 382/48 |
| 4,742,555 | 5/1988 | Tonkin | 382/50 |
| 5,103,489 | 4/1992 | Miette | 382/48 |
| 5,202,557 | 4/1993 | Robertson | 250/223 R |
| 5,308,960 | 5/1994 | Smith et al. | 235/454 |
| 5,327,171 | 7/1994 | Smith et al. | 348/223 |
| 5,492,199 | 2/1996 | Shimoyama | 235/383 |
| 5,497,314 | 3/1996 | Novak | 235/383 |
| 5,525,786 | 6/1996 | Dumont | 235/462 |
| 5,560,450 | 10/1996 | Kouno | 235/383 |
| 5,609,223 | 3/1997 | Iizaka et al. | 235/383 |
| 5,679,941 | 10/1997 | Iizaka et al. | 235/383 |
| 5,719,678 | 2/1998 | Reynolds et al. | 235/383 |

FOREIGN PATENT DOCUMENTS

| | | |
|---|---|---|
| 0 647 479 A2 | 4/1995 | European Pat. Off. . |
| 0 647 479 A3 | 4/1995 | European Pat. Off. . |
| 1 270 801 | 5/1969 | United Kingdom . |

OTHER PUBLICATIONS

IBM Technical Disclosure Bulletin, *Parcel Positioning Scanning and Sorting System,* vol. 15, No. 4, Sep. 1972, pp. 1170–1171.

*Primary Examiner*—Donald Hajec
*Assistant Examiner*—Daniel St. Cyr
*Attorney, Agent, or Firm*—Jones & Askew, LLP

[57] ABSTRACT

An optically-guided indicia reader 10 system including a conveyor 12 carrying a parcel 14 bearing a destination address 20. An illumination source 24 defines a static area 26 to assist the positioning of the parcel 14 on the conveyor 12. A scanner 32 and a computer memory 42 of a character recognition system 40 are operated so as to store an image of a region defined with respect to the moving illuminated area 26. A sensor assembly 28, including a height sensor and reflectivity sensor, is located toward the downstream location of the illumination source 24. The scanner 32 is focused in response to height data from the height sensor, and the gain of the scanner 32 is adjusted in response to reflectivity data from the reflectivity sensor, so that the scanner 32 generates a clear image of the top of the parcel 14 as the parcel 14 passes beneath the scanner 32. A photo sensor 45 is positioned upstream from the scanner 32 to detect the presence of the parcel 14. The video data generated by the scanner 32 may be stored in the computer memory 42 only when the beam 50 of the photo sensor 45 is broken. A time delay may be imposed to account for the distance between the beam 50 and the scan line 34.

10 Claims, 1 Drawing Sheet

OPTICALLY-GUIDED INDICIA READER SYSTEM FOR ASSISTING IN POSITIONING A PARCEL ON A CONVEYOR

TECHNICAL FIELD

The present invention relates to image processing and more particularly relates to over-the-belt optical character recognition (OCR) systems. Specifically, the invention relates to an indicia reader system that includes a projected optical guide to assist the positioning of parcels on a conveyor.

BACKGROUND OF THE INVENTION

For years, machines have been used to scan parcels as they travel along a conveyor. Over-the-belt optical character recognition (OCR) systems have been recently developed that can read indicia, such as a typed or hand-written destination address on parcels to be shipped. Parcel delivery companies, such as United Parcel Service, ship millions of parcels every day. These parcel delivery companies make extensive use of OCR systems to read the destination address labels on parcels to facilitate sorting and routing the parcels to their proper destinations.

The fundamental physical components of an OCR system are a scanner and a character recognition system including a central processing unit (CPU), a computer memory, and a sophisticated character recognition program module. The scanner is typically an optical camera, such as a charge-coupled device (CCD) array, that captures an image of the destination address on the parcels as they travel past the scanner on the conveyor. Generally, a continuous video image of the conveyor carrying the parcels is captured by the scanner, which video image is converted into digital format and transmitted to the character recognition system. But only a small part of the video image, such as the portions including the destination addresses of the parcels, needs to be processed by the character recognition system. The OCR system, therefore, must have some way to identify the portions of the video image that need to be processed by the character recognition system.

One approach is to store the entire video image created by the scanner, and later parse out the portions of the video image that need to be processed by the character recognition system. But a continuously running scanner generates an enormous amount of video data. This data is formatted as a continuous bit map of the conveyor as the conveyor carries parcels past the scanner, which bit map inherently convey information about the spatial relationship of the pixels of the image. Storing this continuous bit map requires an enormous amount of computer memory. It is therefore advantageous to reduce the memory storage requirement.

Data compression is one technique for reducing the memory storage requirement. The video data may be compressed for storage using any of a variety of well known data compression methods, such as run length encoding. These data compression techniques, however, alter the bit-map format of the data. This is undesirable because it is advantageous for the character recognition program module to operate on bit maps that allow easy access to information regarding neighborhoods around individual pixels. The compressed data must therefore be uncompressed, typically into a frame buffer, for processing by the character recognition program module. Compressing the video data, for storage, and then uncompressing the video data for processing, burdens the CPU and slows the character recognition process.

Real-time extraction of the desired portions of the video data is another technique for reducing the memory storage requirement. Indeed, real-time data extraction is a very effective technique because most of the video data created by the continuously running scanner is a useless image of the conveyor and the non-indicia bearing areas of the parcels moving along the conveyor; only a small percentage of the data includes the destination addresses of the parcels to be shipped. Therefore, extracting only small portions of the video data, such as relatively small areas covering the destination addresses, greatly reduces the memory storage requirement and speeds up the character recognition process.

Systems have been developed for triggering a video camera system so as to store only desired video images. For example, Tonkin, U.S. Pat. No. 4,742,555, describes a mechanical limit switch, optical sensor, or magnetic sensor that triggers a video system to capture and store an image of a parcel as the parcel reaches a predetermined location along a conveyor. But the system described by Tonkin would have a significant drawback if applied to a parcel shipping system. This is because the system described by Tonkin captures an image of the entire parcel; is not operative for capturing only a specific portion of the image, such as the destination address. In a parcel shipping system, the destination address must be captured for sorting and routing purposes, but other indicia on the parcel, such as the return address, is not needed to route the parcel to its proper destination. It is therefore advantageous to identify the destination address prior to storing the image of the parcel, so that only the portion of the image containing the destination address may be stored in the computer memory.

Several difficulties are encountered, however, in attempting to identify the destination addresses on various parcels traveling on a conveyor. First, the destination addresses may vary in size, and may be in different locations on different parcels. Second, the parcels themselves may vary in size, shape, and position on the conveyor. Thus, the exact position of a destination address on a parcel cannot be determined by simply detecting the edge of the parcel using a limit switch or sensor, as described by Tonkin.

Systems have been developed for storing video images of selected portions of parcels traveling of a conveyor. For example, Kizu et al., U.S. Pat. No. 4,516,265, describes a two camera system that reads the postal (zip) codes on envelopes traveling on an envelope transport system. The system includes a low resolution prescanner that coarsely scans the surface of the envelope. The position of the destination address block is determined from the coarse scan, and the coordinates of the destination address block with respect to the leading edge of the envelope are then passed to a second, high-resolution camera system. The second camera system stores an image of the destination address block by first detecting the leading edge of the envelope. The second camera system begins storing an image of the destination address block when the block reaches the second camera, and stops storing the image when the block moves past the second camera. A postal code reader subsequently processes the high-resolution scan to read the postal code.

Another example is disclosed in the commonly owned U.S. patent application Ser. No. 08/536,512, entitled "Two Camera System for Locating and Storing Indicia on Conveyed Items." This application describes a two camera system that reads the destination addresses on parcels traveling on a conveyor. A fluorescent ink fiduciary mark is superimposed relative to the destination address on a parcel.

A first camera captures an image of the fiduciary mark, the position and orientation of which is ascertained. The position and orientation of the fiduciary mark is then used to extract an image of the destination address from a video data signal created by a second camera, which is positioned downstream from the first camera. The image of the destination address is stored in a computer memory for subsequent processing by a character recognition system.

The two camera systems described above are very effective at minimizing the amount of video data that must be stored in an OCR system. They are, however, rather expensive systems that are best suited for very high-speed parcel handling systems. The cost associated with these systems may not be justified for many lower-speed parcel handling systems. There is, therefore, a need for a less expensive system for minimizing the amount of video data that must be stored in an OCR system. In particular, there is a need for an inexpensive indicia reader system that is suited to low- to medium-speed parcel handling systems.

SUMMARY OF THE INVENTION

The invention seeks to provide a low-cost system for minimizing the amount of video data that must be stored in an OCR system. In particular, the invention seeks to provide an inexpensive indicia reader system suited to low-to medium-speed parcel handling systems.

In accordance with the invention, this object is accomplished in an indicia reader system that includes an optical guide to assist the positioning of parcels on a conveyor. An operator positions a parcel on the conveyor so that indicia to be imaged, such as the destination address on the parcel, is within a static area defined by light projected toward the conveyor. The parcel may also be positioned on the conveyor so that other indicia that is not to be imaged, such as the return address on the parcel, is not within the area defined by the light projected toward the conveyor.

The optically-guided indicia reader system may also include a proximity sensor, such as a photo detector, for detecting the arrival of the parcel at the scanner. In response to a signal from the proximity sensor, the computer memory and the scanner may be operated so as to store an image of a region having a width approximately equal to the width of the area defined by the illumination source, and a length approximately equal to the length of the parcel in the direction of conveyor travel.

The optically-guided indicia reader system may also include a reflectivity sensor located upstream of the scanner and positioned to determine reflectivity data associated with the parcel. A communication link transmits the reflectivity data from the reflectivity sensor to the scanner, and the gain of the scanner is adjusted in response to the reflectivity data. In addition, an optically-guided indicia reader system may include a height sensor located above the conveyor and upstream of the scanner and positioned to determine height data associated with the parcel at the location of the destination address. A communication link transmits the height data from the height sensor to the scanner, and the scanner is focused in response to the height data.

That the present invention improves over the drawbacks of the prior art and accomplishes the objects of the invention will become apparent from the following detailed description of the preferred embodiment and the appended drawings and claims.

DETAILED DESCRIPTION

Figure 1:
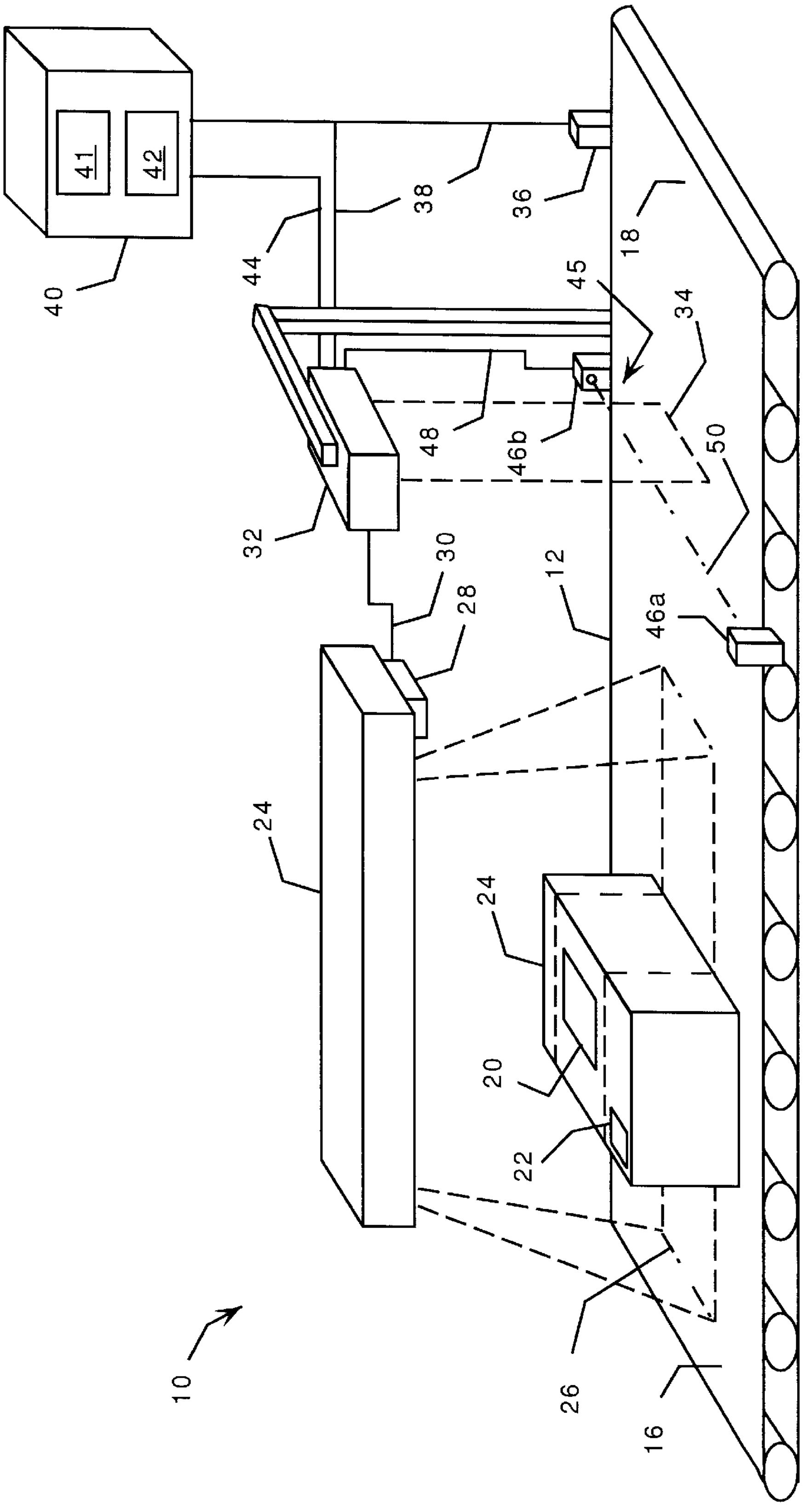
FIG. 1 is a diagram of an optically-guided indicia reader system.

FIG. 1 is a diagram of an optically-guided indicia reader system 10 that includes a conveyer 12 carrying a parcel 14 from an upstream location 16 to a downstream location 18 of the conveyor 12. The parcel 14 includes indicia to be read by the optically-guided indicia reader system 10, such as a destination address 20. The parcel 14 may include other indicia, such as the return address 22, that the indicia reader system 10 preferably avoids reading.

An illumination source 24 is positioned to define a static area 26 to assist in positioning the parcel 14 on the conveyor 12. The area 26 is static in that it does not travel along with the conveyor 12, but remains stationary with respect to an operator station that is located along side the conveyor 12. Thus, the conveyor 12 travels through the area 26, which is defined by light projected by the illumination source 24.

The illumination source 24 may define the area 26 many different ways. For example, illumination source 24 may illuminate the interior of area 26, or the border of the area 26, or two spaced-apart parallel lines in the direction of conveyor travel, etc. The illumination source 24 is positioned a sufficient distance above the conveyor 12 so that the parcel 14 may be positioned on the conveyor 12 to pass beneath the illumination source 24. An operator may therefore view the area 26, which is defined by light projected by the illumination source 24, directly on the parcel 14 as the operator positions the parcel 14 on the conveyor 12. The area 26 thus provides an optical guide to assist the operator in positioning the parcel 14 on the conveyor 12.

A sensor assembly 28, including a height sensor and reflectivity sensor, my be located toward the downstream end of the illumination source 24. A communication link 30 functionally connects the sensor assembly 28 to a scanner 32 that is located downstream from the sensor assembly 28. The scanner 32 is focused in response to height data from the height sensor, and the gain of the scanner 32 is adjusted in response to reflectivity data from the reflectivity sensor, so that the scanner 32 generates a clear image of the top of the parcel 14 as the parcel 14 passes beneath the scanner 32. The scanner 32 is preferably positioned so that the scan line 34 is oriented across a portion of the conveyor 12 that is aligned with the area 26 in the cross-machine direction.

A belt encoder 36 measures the displacement of the conveyor 12. A communication link 38 functionally connects the belt encoder 36 to the scanner 32 and to a character recognition system 40 that includes a processing unit 41 and a computer memory 42. Another communication link 44 functionally connects the character recognition system 40 to the scanner 32. The height data from the sensor assembly 28 indicates the presence of a parcel 14 on a particular location of the conveyor 12. Thus, the height data and the signal from the belt encoder 36 may be used to determine when a parcel 14 is present at the scanner 32.

Alternatively, a proximity sensor, such as a photo sensor 45, may be positioned upstream from the scanner 32. A communication link 48, functionally connects the scanner 32 to the photo sensor 45. The photo sensor includes a light source **46*a* that projects a columnar beam of light 50 toward a photo detector 46*b*. The photo sensor 45 detects the presence of the parcel 14 as it passes by the photo sensor 45 because the parcel 14 breaks the beam of light 50. Many other types of proximity sensors, such as a mechanical or a magnetic sensor, may equivalently be used to detect the location of the parcel 14 on the conveyor 12**.

The belt encoder 36 is a standard belt-driven, opto-mechanical encoder that provides a signal indicating the linear displacement of the conveyor 12. The CCD array of the scanner 32 is cycled in response to the signal from the belt encoder 26 to generate a series of analog images of the scan line 34 that are transmitted to an analog-to-digital converter within the scanner 32. The analog-to-digital converter of the scanner 32 uses a standard thresholding or similar process to convert the analog signal produced by the CCD array of the scanner 32 into an eight-bit digital video signal that is transmitted via the communication link 44 to the character recognition system 40, which stores the video data in the computer memory 42 for subsequent processing.

The region to be stored in the computer memory 42 may include all or part of the scan line 34. This may be accomplished by only storing the output of all or only a portion of the cells of the scanner 32. The region to be stored in the computer memory 42 is preferably aligned with and has a length that is approximately equal to the width of the area 26 so that the region stored in the computer memory 42 corresponds to, but is downstream from, the area 26 defined by the illumination source 24. This assists an operator in orienting a parcel 14 so that the destination address 20 can be effectively scanned by the indicia reader system 10 as configured.

Alternatively, the operator may determine that the parcel 14 cannot be oriented so that the destination address 20 can be effectively scanned by the indicia reader system 10 as configured. This may happen if the destination address 20 is larger than the region to be stored in the computer memory 42. In this case, the operator can divert the parcel 14 for hand sorting or imaging using a differently configured indicia reader system.

The scanner 32 may run continuously, so that region generated by the scanner 32 and stored in the computer memory 42 of the character recognition system 40 is a continuous strip having a width approximately equal to the width of the area 26 defined by the illumination source 24. The size of the region may be further reduced by using the height data from the sensor assembly 28 or the signal from the photo sensor 45 to trigger the storage of video data generated by the scanner 32. For example, the video data generated by the scanner 32 may be stored in the computer memory 42 only when the beam 50 of the photo sensor 45 is broken. A time delay may be imposed to account for the distance between the beam 50 or the sensor assembly 28 and the scan line 34. In this manner, an image of a strip of the top of the parcel 14 including the destination address 20 may be stored in the computer memory 42. That is, an image of a region of the parcel 14 having a width approximately equal to the width of the area 26 defined by the illumination source 24, and a length approximately equal to the length of the parcel 14 in the direction of conveyor travel, may be stored in the computer memory 42 of the character recognition system 40.

Triggering the storage of the image of the region in the computer memory 42 may be accomplished in several different ways. For example, the scanner 32 may be toggled on and off by the signal from the photo sensor 45 or the sensor assembly 28 (with an appropriate time delay). Or the scanner 32 may run continuously, and the signal from the photo sensor 45 or the sensor assembly 28 may be used to latch a control line to an input buffer of the character recognition system 40. Alternatively, the signal from the photo sensor 25 or the sensor assembly 28 may be used as an input to a software-based algorithm running on the character recognition system 40, which triggers the storage of video data from the scanner 32 in the computer memory 42. Many other means known to those skilled in the art may equivalently be employed to operate the computer memory 42 and the scanner 32 so as to store an image of a region in the computer memory 42.

To use the static-light indicia reader system 10, an operator positions the parcel 14 on the conveyor 12 so that the destination address 20 is within the area 26 defined by the illumination source 24. The operator may also position the parcel 14 on the conveyor 12 so that other indicia on the parcel 14, such as the return address 22, is not within the area 26 defined by the illumination source 24. It will be appreciated that many other types of indicia may be placed within, or excluded from, the area 26, such a barcode, a two-dimensional code, a hologram, etc.

Acceptable performance is experienced when optically-light indicia reader system 10 is configured as follows. The area 26 is typically a rectangular strip that is significantly narrower than the conveyor 12, sufficiently long to allow an operator to easily position a parcel on the conveyor 12 using the optical guide, and approximately in the center of the conveyor 12. For example, the area 26 may be approximately 4 inches (10 cm) in the cross-machine direction and approximately 12 (30 cm) to 36 inches (91 cm) in the direction of conveyor travel. The use of projected illumination, rather than an area painted on the conveyor 12, allows the operator to view the area 26 defined by the illumination source 24 directly on the top of the parcel 14. Thus, there is no displacement between the area 26 and the top of the parcel 14 that could cause parallax-related alignment errors with tall parcels. The use of a relatively narrow area 26 allows the angle of the field of view of the scanner 32 to be relatively narrow so that the scanner 32 generates a sharp image of the top of the parcel 14.

The belt encoder 36 is a standard belt-driven, opto-mechanical encoder that provides a signal indicating the linear displacement of the conveyor 12. The CCD array of the scanner 32 is cycled in response to the signal from the belt encoder 36 to generate a series of analog images of the scan line 34 that are transmitted to an analog-to-digital converter within the scanner 32. The analog-to-digital converter of the scanner 32 uses a standard thresholding or similar process to convert the analog signal produced by the CCD array of the scanner 32 into an eight-bit digital video signal that is transmitted via the communication link 44 to the character recognition system 40, which is operable for storing the video data in the computer memory 42 for subsequent processing.

The scanner 32 is preferably a monochrome, 4,096 pixel line-scan type CCD array such as one using a Thompson TH7833A CCD chip. As the field of view of the scanner 32 is approximately 16 inches (41 cm) at the conveyor 12, the resolution of the image created by the scanner 32 is approximately 256 pixels or "dots" per inch (DPI) (101 dots per cm) across the field of view of the scanner 32. The belt encoder 36 preferably triggers the CCD array of the scanner 32 at a rate of approximately 256 cycles per inch (101 cycles per cm) so that the resolution of the image created by the scanner 32 is approximately 256 pixels or "dots" per inch (DPI) (101 dots per cm) in the direction of conveyor travel. It will therefore be appreciated that a digital image with a correct aspect ratio (i.e., the ratio of the length of the image to the width) may be generated by the scanner 32 and stored in the computer memory 42 of the character recognition system 40 by synchronizing the cycling rate of the scanner 32 with the linear speed of the conveyor 12. See, for example, Shah et al., U.S. Pat. No. 5,291,564, which is incorporated by reference.

The conveyor 12 may be approximately 24 inches (61 cm) wide and travels at linear speeds up to 20 inches per second or 100 feet per minute (51 cm per second or 30 meters per minute) or more. The illumination source 24, which may be any of a variety of commercially-available narrow-beam light sources, is preferably positioned approximately 18 inches (46 cm) above conveyor 12 and defines an area 26 that is approximately 4 inches (10 cm) in the cross-machine direction and approximately 12 (30 cm) to 36 inches (91 cm) in the direction of conveyor travel.

The scanner 32 is preferably mounted to have an optical path of approximately 120 inches (304 cm) to the conveyor 12 with a 16 inch (41 cm) field of view at the conveyor 12. To save space, the scanner 32 is positioned approximately 30 inches (76 cm) above the center of conveyer 12 and is pointed towards a complex of mirrors (not shown) that increases the optical path from the scanner 32 to the conveyor 12 to approximately 120 inches (305 cm). These parameters may be varied somewhat without unduly affecting the performance of the disclosed embodiment of the present invention. See also, Smith et al., U.S. Pat. No. 5,308,960, and Bjorner, et al., U.S. Pat. No. 5,485,263, which are incorporated by reference.

It should also be understood that the scan line 34 may be longer than the width of the region stored in the computer memory 42. For example, the scanner 32 may be positioned to have a field of view (i.e. the scan line 34) equal to approximately 16 inches (41 cm) at the conveyor 12. The region stored in the computer memory 42, however, may only be approximately 4 inches (10 cm), which preferably corresponds to the width of the area 26 defined by the illumination source 24. This may be accomplished by only storing the output of a portion of the cells of the scanner 32 (e.g., the center 1,024 pixels of a 4,096 pixel scanner) in the computer memory 42.

In view of the forgoing, it will be appreciated that the optically-guided indicia reader system 10 reduces the amount of video data that must be stored in the computer memory 42 of the character recognition system 40. The use of projected illumination allows the operator to view the area 30 defined by the illumination source 24, directly on the top of the parcel 14. Thus, there is no displacement between the area 26 and the top of the parcel 14 that could cause parallax-related alignment errors with tall parcels. In addition, the optically-guided indicia reader system 10 allows the angle of the field of view of the scanner 32 to be relatively narrow so that the scanner 32 generates a sharp image of the top of the parcel 14.

It should be understood that the foregoing relates only to specific embodiments of the present invention, and that numerous changes may be made therein without departing from the spirit and scope of the invention as defined by the following claims.

What is claimed is:

1. An optically-guided indicia reader system comprising:

a conveyor for transporting a parcel from an upstream location of the conveyor to a downstream location of the conveyor;

an illumination source positioned to define a static area to assist in positioning the parcel on the conveyor; the static area defining an elongate strip having a width that is narrower than the conveyor;

a scanner located downstream of the illumination source;

a computer memory for storing the image; and means for operating the scanner and the computer memory so as to capture an image of a region that has a width approximately equal to the width of the static area.

2. The optically-guided indicia reader system of claim 1, further comprising:

a height sensor located upstream of the scanner and positioned to determine height data associated with the parcel;

a communication link for transmitting the height data from the height sensor to the scanner; and means for focusing the scanner in response to the height data.

3. The optically-guided indicia reader system of claim 1, further comprising:

a reflectivity sensor located upstream of the scanner and positioned to determine reflectivity data associated with the parcel;

a communication link for transmitting the reflectivity data from the reflectivity sensor to the scanner; and means for adjusting the gain of the scanner in response to the reflectivity data.

4. The optically-guided indicia reader system of claim 1, further comprising:

means for operating the computer memory and the scanner so as to store an image of a region having a width approximately equal to the width of the area.

5. The optically-guided indicia reader system of claim 1, further comprising:

a proximity sensor for detecting the presence of the parcel at a predefined position along the conveyor; and a communication link between the proximity sensor and the scanner; and means for, in response to the proximity data, operating the computer memory and the scanner so as to store an image of a region having a width approximately equal to the width of the area and a length approximately equal to the length of the parcel in the direction of conveyor travel.

6. A method for obtaining an image of indicia on a parcel, comprising the steps of:

providing a conveyor for transporting a parcel from an upstream location of the conveyor to a downstream location of the conveyor;

providing an illumination source positioned to define a static area to assist in positioning the parcel on the conveyor, the static area owing an elongate strip having a width that is narrower than the conveyor;

positioning the parcel so that the indicia is within the area defined by the illumination source;

operating a scanner to capture an image of a region that has a width approximately equal to the width of the area to obtain an image of the indicia; and storing the image in a computer memory.

7. The method of claim 6, further comprising the steps of:

generating height data associated with the parcel; and focusing the scanner in response to the height data.

8. The method of claim 6, further comprising the steps of:

generating reflectivity data associated with the parcel; and adjusting the gain of the scanner in response to the reflectivity data.

9. The method of claim 6, further comprising the steps of:

operating a computer memory and a scanner so as to store an image of a region having a width approximately equal to the width of the area.

10. A method of claim 6, further comprising the steps of:

generating proximity data associated with the parcel; and in response to the proximity data, operating a computer memory and a scanner so as to store an image of a region having a width approximately equal to the width of the area and a length approximately equal to the length of the parcel in the direction of conveyor travel.

* * * * *